United States Patent [19]

Pfeiffer

[11] Patent Number: 5,704,590
[45] Date of Patent: Jan. 6, 1998

[54] DRAIN VALVE FOR BLADDER-TYPE BULK CONTAINER

[75] Inventor: Pierre Pfeiffer, Drulingen, France

[73] Assignee: Sotralentz S.A., Drulingen, France

[21] Appl. No.: 780,377

[22] Filed: Jan. 8, 1997

[30] Foreign Application Priority Data

Jan. 10, 1996 [DE] Germany ............... 196 00 642.2

[51] Int. Cl.[6] ............................................. F16K 5/04
[52] U.S. Cl. ........................................ 251/312; 251/309
[58] Field of Search ................................. 251/309, 312

[56] References Cited

U.S. PATENT DOCUMENTS

| | | | |
|---|---|---|---|
| 3,185,179 | 5/1965 | Harautumien | 251/309 X |
| 3,790,132 | 2/1974 | Schmitt | 251/312 |
| 3,931,954 | 1/1976 | Guzzetta | 251/309 X |
| 4,794,944 | 1/1989 | Henry | 251/309 X |
| 4,890,817 | 1/1990 | Uri | 251/312 |

FOREIGN PATENT DOCUMENTS

| | | | |
|---|---|---|---|
| 703515 | 2/1965 | Canada | 251/312 |
| 1057841 | 5/1959 | Germany | 251/312 |

Primary Examiner—John Fox
Attorney, Agent, or Firm—Herbert Dubno

[57] ABSTRACT

A valve has a molded plastic valve housing defining an inlet port, an outlet port, and a chamber between the ports. The housing also has a collar defining an opening into the chamber and carrying a molded plastic cap formed with a central hole. A molded plastic valve body is rotatable about a body axis between open and closed positions in the chamber and is unitarily formed with a throughgoing passage aligned with the ports only in the open position, a stem extending along the body axis through the hole of the cap, axially oppositely open mass-reducing pockets, and an annular rim captured between the cap and the collar.

6 Claims, 2 Drawing Sheets

DRAIN VALVE FOR BLADDER-TYPE BULK CONTAINER

FIELD OF THE INVENTION

The present invention relates to a valve. More particularly this invention concerns a drain valve used on a pallet-mounted bladder-type bulk container.

BACKGROUND OF THE INVENTION

A standard bulk container as described in U.S. Pat. Nos. 5,958,747 and 5,253,776 comprises a large flexible bladder, typically capable of holding a volume of about 1 m³ that sits on a pallet and is surrounded by a metallic cage. The bladder is normally filled with a liquid or a fluent powder so that the full container can easily weigh around 1 ton.

The lower region is typically fitted with a generously ported valve of the cock type. Such a valve comprises a valve housing fixed to the bladder and having a pair of aligned ports, a mainly cylindrical valve body between the ports formed with cutouts and rotatable between an open position with the cutouts forming a passage between the ports and a closed position blocking flow between the ports, and a cover holding the valve body in place. As a rule all the principal parts are made of plastic. The lower side of the valve body is often concave so that unless the valve is constructed to very high tolerances, is made solid, or is provided with extra seals, liquid can collect in this pocket under the valve body. The liquid trapped in the valve like this can spill out when the container is handled, creating a problem or even a serious hazard when, for example, the container is used to ship acid or fuel.

Since such bulk shipment containers are frequently not recycled, it is essential that they and their parts be manufactured as cheaply as possible. At the same time the considerable amount of liquid (or even particles) in the container exert a considerable pressure on the valve so it must seal securely when closed. Furthermore the valve must provide a large flow cross section when opened so that the contents can be drained quickly and so that even relatively nonfluent or viscous contents can pass through the valve easily.

OBJECTS OF THE INVENTION

It is therefore an object of the present invention to provide an improved valve for a bladder-type storage/transport container.

Another object is the provision of such an improved valve for a bladder-type storage/transport container which overcomes the above-given disadvantages, that is which is of very simple construction, which itself retains no liquid when closed, and which can withstand substantial pressure when closed while providing a large flow cross section when open.

SUMMARY OF THE INVENTION

A valve has according to the invention a molded plastic valve housing defining an inlet port, an outlet port, and a chamber between the ports. The housing also has a collar defining an opening into the chamber and carrying a molded plastic cap formed with a central hole. A molded plastic valve body is rotatable about a body axis between open and closed positions in the chamber and is unitarily formed with a throughgoing passage aligned with the ports only in the open position, a stem extending along the body axis through the hole of the cap, axially oppositely open mass-reducing pockets, and an annular rim captured between the cap and the collar.

Such a valve can be produced at very low cost yet will seal against considerable pressures, both the static pressures created by the container contents and any dynamic pressured created as the container is moved. The valve body can be produced easily by injection molding from a thermoplastic resin. No sump or collecting cavity in which liquid can collect is formed in such a valve.

According to the invention one of the pockets annularly surrounds the stem and the housing is formed with a floor confronting the other pocket of the body. More particularly, the body has a tubular extension coaxially surrounding the stem and formed with an outwardly projecting lip constituting the rim. In addition the body and housing are also formed with cooperating formations defining the open and closed positions.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
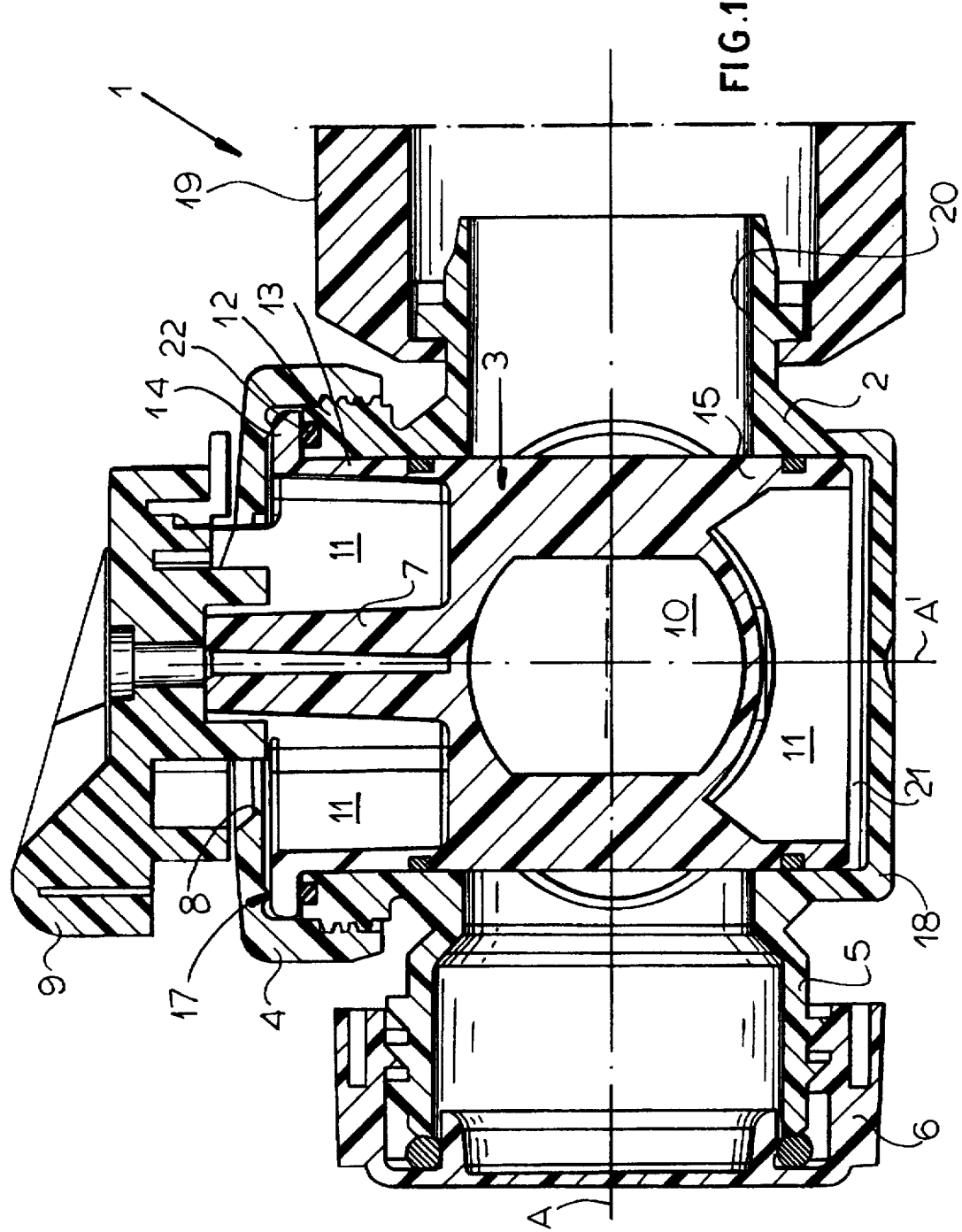
FIG. 1 is an axial section through a valve according to the invention.
Figure 2:
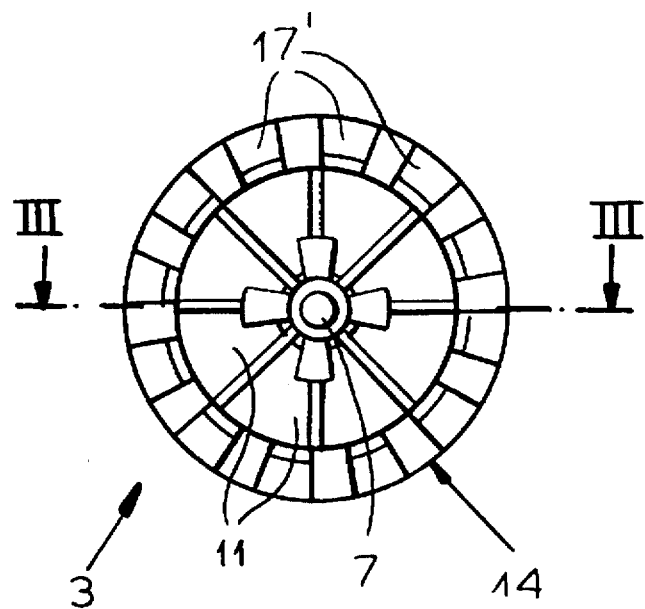
FIG. 2 is a small-scale top view of the valve body.
Figure 3:
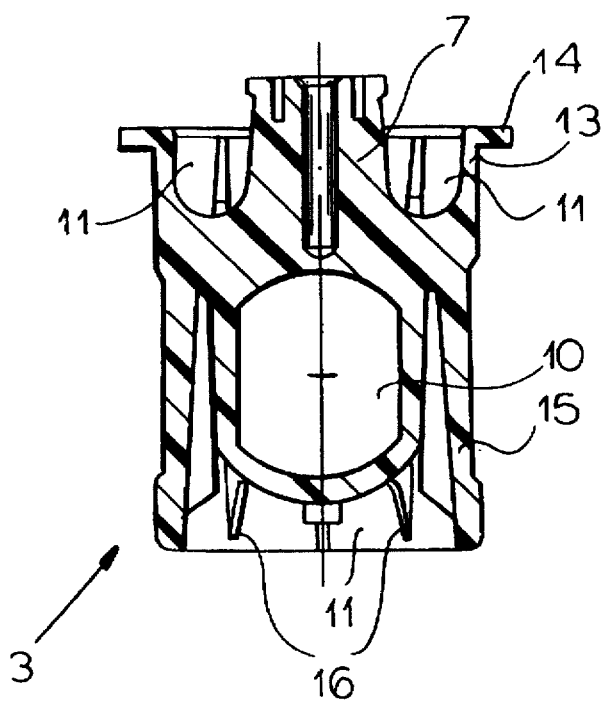
FIG. 3 is a section taken along line III—III of FIG. 2.

As seen in FIG. 1 a valve 1 according to the invention is mounted on a molded nipple 19 formed on a bladder-type storage/transport container. The valve 1 has a molded thermoplastic housing 2 having a tubular inlet port 20 fixed in the nipple 19 and a tubular outlet port 5 aligned on a flow axis A with the port 20 and normally closed by a removable cap 6. A one-piece molded valve body 3 is provided in a chamber 21 of the valve housing 2 between the ports 5 and 20 and is formed with a throughgoing passage 10 that can be aligned with the ports 5 and 20 in an open position of the valve 1 or that can be oriented perpendicular to the axis A in the illustrated closed position of the valve 1. The chamber 21 has a cylindrical floor pocket 18 and is upwardly closed by a cap 4 formed with a central hole 8 and threaded onto a collar 12 of the housing 2.

According to the invention the valve body 3 is centered on a body axis A' perpendicular to the flow axis A and is formed centered on the body axis A' with an upwardly extending stem 7 extending through the hole 8 in the cap 4 and provided with a handle 9 for manual actuation of the valve 1. The body 3 is further formed with upwardly and downwardly open pockets 11 that reduce the mass and cost of this part, and has at its upper end a tubular extension 13 formed with an outwardly turned annularly continuous rim 14 that is compressed between the cap 4 and a seal 22 on the upper face of the collar 12. At its lower side the body 3 is extended as a tubular wall 15 extending into and sealed directly against the side walls of the floor pocket 18 so that the lower pocket will not fill with liquid during normal use of the valve 1.

The lower side of the body 3 is provided in the pocket 11 with abutment elements 16 that serve to limit the angular movement of the body 3. Unillustrated counter abutments are provided on the housing 2. In addition small recesses 17' in the upper face of the rim 14 can cooperate with other formations such as bumps 17 on the cap 4 to define open and closed positions of the valve 1.

We claim:

1. A valve comprising:
   a molded plastic valve housing defining an inlet port, an outlet port, and a chamber between the ports, the housing having a collar defining an opening into the chamber;
   a molded plastic cap secured over the collar and formed with a central hole; and
   a molded plastic valve body rotatable about a body axis between open and closed positions in the chamber and unitarily formed with
   a throughgoing passage aligned with the ports only in the open position,
   a stem extending along the body axis through the hole of the cap,
   axially oppositely open mass-reducing pockets, and
   an annular rim captured between the cap and the collar.

2. The valve defined in claim 1 wherein one of the pockets annularly surrounds the stem.

3. The valve defined in claim 2 wherein the housing is formed with a floor confronting the other pocket of the body.

4. The valve defined in claim 3 wherein the body has a tubular extension coaxially surrounding the stem and formed with an outwardly projecting lip constituting the rim.

5. The valve defined in claim 1 wherein the body and housing are also formed with cooperating formations defining the open and closed positions.

6. The valve defined in claim 1 wherein the inlet and outlet ports are centered on a flow axis perpendicular to the body axis.

* * * * *